United States Patent
Hu et al.

(10) Patent No.: US 11,300,868 B2
(45) Date of Patent: Apr. 12, 2022

(54) PROJECTION SCREEN

(71) Applicant: APPOTRONICS CORPORATION LIMITED, Shenzhen (CN)

(72) Inventors: Fei Hu, Guangdong (CN); Zuqiang Guo, Guangdong (CN); Yi Li, Guangdong (CN)

(73) Assignee: APPOTRONICS CORPORATION LIMITED, Shenzhen (CN)

(*) Notice: Subject to any disclaimer, the term of this patent is extended or adjusted under 35 U.S.C. 154(b) by 0 days.

(21) Appl. No.: 16/772,641

(22) PCT Filed: Jan. 31, 2018

(86) PCT No.: PCT/CN2018/074735
§ 371 (c)(1),
(2) Date: Jun. 12, 2020

(87) PCT Pub. No.: WO2019/114120
PCT Pub. Date: Jun. 20, 2019

(65) Prior Publication Data
US 2021/0080818 A1    Mar. 18, 2021

(30) Foreign Application Priority Data
Dec. 14, 2017    (CN) .......................... 201711338206.5

(51) Int. Cl.
*G03B 21/60* (2014.01)
*G03B 21/56* (2006.01)
(Continued)

(52) U.S. Cl.
CPC ........... *G03B 21/60* (2013.01); *G03B 21/567* (2013.01); *G03B 21/62* (2013.01); *G02B 5/18* (2013.01); *G03B 21/604* (2013.01)

(58) Field of Classification Search
CPC ...... G03B 21/567; G03B 21/60; G03B 21/56; G02B 5/18; G02B 2005/1804
(Continued)

(56) References Cited

U.S. PATENT DOCUMENTS 7,517,091 B2 * 4/2009 Lippey ................... G03B 21/26
353/84
2007/0014004 A1   1/2007 Wood
(Continued)

FOREIGN PATENT DOCUMENTS

CN          1487357 A      4/2004
CN        101162361 A      4/2008
(Continued)

OTHER PUBLICATIONS

First Search of Application No. CN2017113382065, dated Dec. 29, 2020.
(Continued)

*Primary Examiner* — Christopher E Mahoney
(74) *Attorney, Agent, or Firm* — Marshall, Gerstein & Borun LLP

(57) ABSTRACT

A projection screen, comprising a screen substrate and a plurality of light reflecting portions, wherein the light reflecting portion is arranged on an incident side of the screen substrate, and has a first surface and a second surface that face different directions, the first surface facing an incident direction of projection light, and the plurality of light reflecting portions are continuously arranged on the screen substrate to form a structure of sawtooth shape, wherein a light absorbing layer is provided on the second surface; and a wavelength-selection filter layer is provided on the first surface, and the wavelength-selection filter layer is configured to reflect the projection light and transmit and absorb at least part of ambient light.

20 Claims, 8 Drawing Sheets

(51) Int. Cl.
*G03B 21/604* (2014.01)
*G02B 5/18* (2006.01)
*G03B 21/62* (2014.01)

(58) Field of Classification Search
USPC .................................................. 359/449, 459
See application file for complete search history.

(56) References Cited

U.S. PATENT DOCUMENTS

| | | | | |
|---|---|---|---|---|
| 2007/0217003 | A1* | 9/2007 | May | G02B 5/0221 |
| | | | | 359/454 |
| 2008/0030882 | A1* | 2/2008 | Ichikawa | G03B 21/60 |
| | | | | 359/839 |
| 2011/0279781 | A1* | 11/2011 | Wei | G03B 21/60 |
| | | | | 353/31 |
| 2013/0170028 | A1* | 7/2013 | Arakawa | G03B 21/60 |
| | | | | 359/449 |
| 2015/0286125 | A1* | 10/2015 | Powell | G03B 21/60 |
| | | | | 359/443 |
| 2016/0088271 | A1* | 3/2016 | Candry | G09G 3/003 |
| | | | | 353/31 |

FOREIGN PATENT DOCUMENTS

| | | |
|---|---|---|
| CN | 102736390 A | 10/2012 |
| CN | 104796646 A | 7/2015 |
| CN | 104914660 A | 9/2015 |
| CN | 106990667 A | 7/2017 |
| JP | 2005266262 A | 9/2005 |
| JP | 2012252049 A | 12/2012 |

OTHER PUBLICATIONS

First Office Action, The State Intellectual Property Office of People's Republic of China, issued to Application No. CN2017113382065, dated Jan. 7, 2021.
International Search Report for International Application No. PCT/CN2018/074735, dated Sep. 11, 2018.

* cited by examiner

PROJECTION SCREEN

CROSS-REFERENCE TO RELATED APPLICATION

This is the United States national phase of International Patent Application No. PCT/CN2018/074735 filed Jan. 31, 2018, which claims priority to CN201711338206.5 filed Dec. 14, 2017, the entire contents of each of which are hereby incorporated by reference.

TECHNICAL FIELD

The present disclosure relates to a screen. Specifically, the present disclosure relates to a projection screen capable of resisting ambient light.

BACKGROUND

In recent years, with increasing brightness of projectors, large-sized projection display systems have been widely used. In the projection display system, in addition to the projector, the projection screen is one of the most commonly used products as peripheral devices. According to different application requirements such as business promotion, exhibition, academic conference, home theater, etc., various types of projection screens have appeared on the market.

For projection display of the projection screen, image contrast is an important parameter for evaluating quality of a screen image. Usually, the contrast of the projector can reach thousands to one. But in practical applications, ambient light will have a relatively strong influence on the contrast of the screen image, causing the contrast to drop seriously which greatly affects viewing experience. Therefore, it is necessary to reduce the adverse effects of the ambient light on the projection display by technical means to bring the projection image relatively high contrast, so as to improve the display quality.

SUMMARY

In view of the above problems, the present disclosure desires to provide an anti-ambient light projection screen capable of further improving the contrast of display images.

An embodiment of the present disclosure provides a projection screen, the projection screen includes a screen substrate and a plurality of light reflecting portions, wherein the light reflecting portion is arranged on a side of the screen substrate, and has a first surface and a second surface that face different directions, the first surface faces an incident direction of projection light, and the plurality of light reflecting portions are continuously arranged on the screen substrate to form a structure of sawtooth shape. A light absorbing layer is provided on the second surface, a wavelength-selection filter layer is provided on the first surface, and the wavelength-selection filter layer is configured to reflect the projection light and transmit and absorb at least part of ambient light.

Another embodiment of the present disclosure provides a projection screen, wherein a wavelength-selection filter layer is provided on an incident surface of a projection screen, and configured to reflect projection light and absorb at least part of ambient light based on a difference in wavelength characteristics of the projection light and the ambient light.

As described above, the projection screen according to the present disclosure can, based on a definition of general etendue, improve the image contrast of the projection screen by adopting means of at least one dimension including a dimension of wavelength.

It should be understood that beneficial effects of the present disclosure are not limited to the above-mentioned effects but may be any beneficial effects described herein.

DESCRIPTION OF EMBODIMENTS

Figure 1:
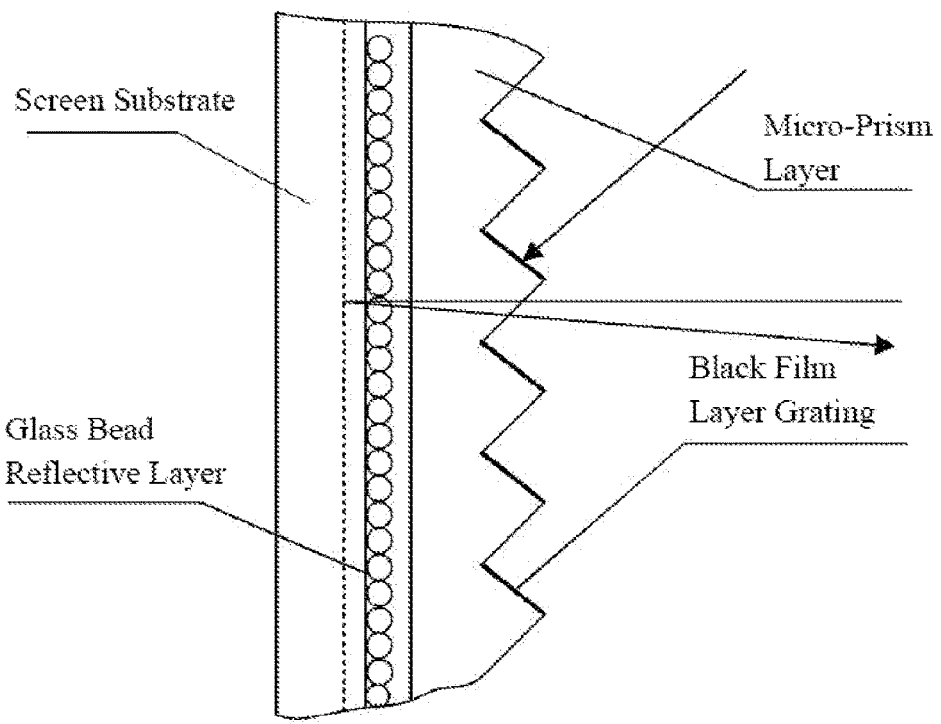
FIG. 1 is a schematic view showing an example of a projection screen in the related art.

Hereinafter, specific embodiments according to the present disclosure will be described in detail with reference to the drawings. It should be emphasized that all dimensions in the drawings are only schematic and are not necessarily shown in real scale, and thus are not limitative. For example, it should be understood that sizes, thicknesses, ratios, angles, etc. of various layers and various parts in the projection screen are not shown according to actual dimensions and ratios, but only for a convenience of illustration.

Figure 2:
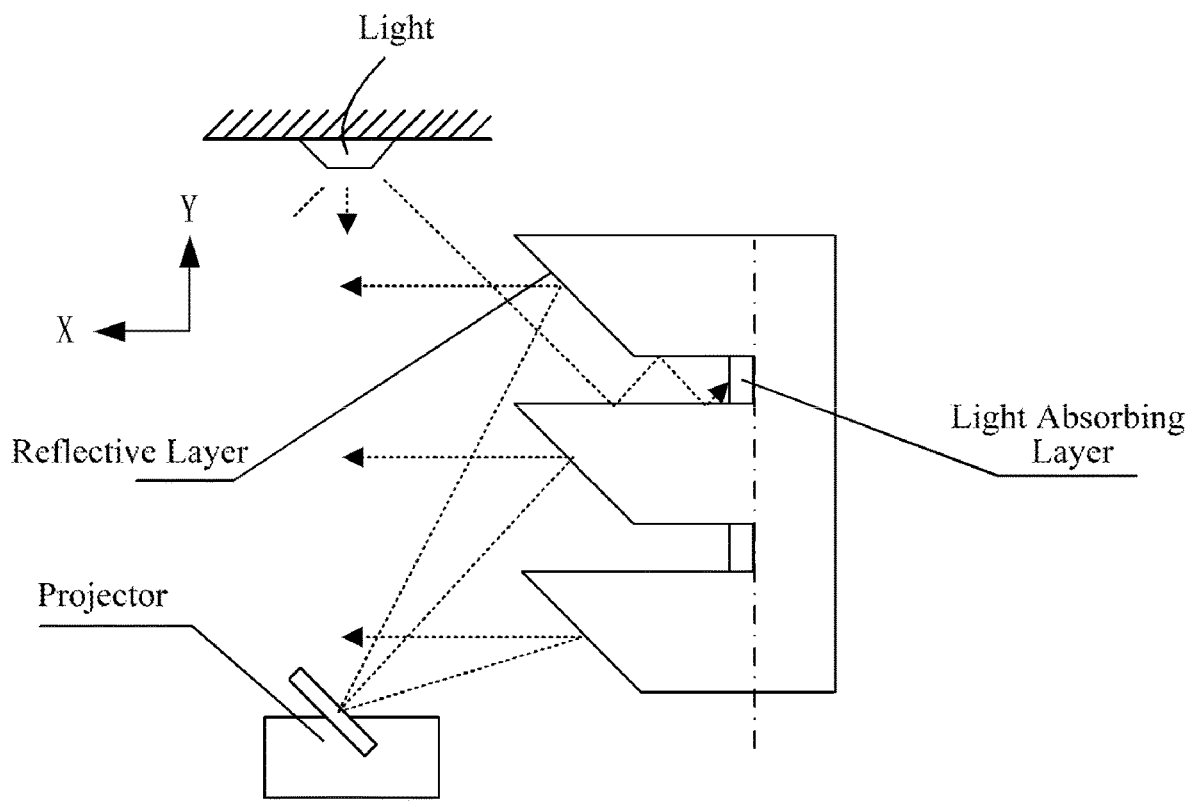
FIG. 2 is a schematic view showing another example of a projection screen in the related art.
Figure 3:
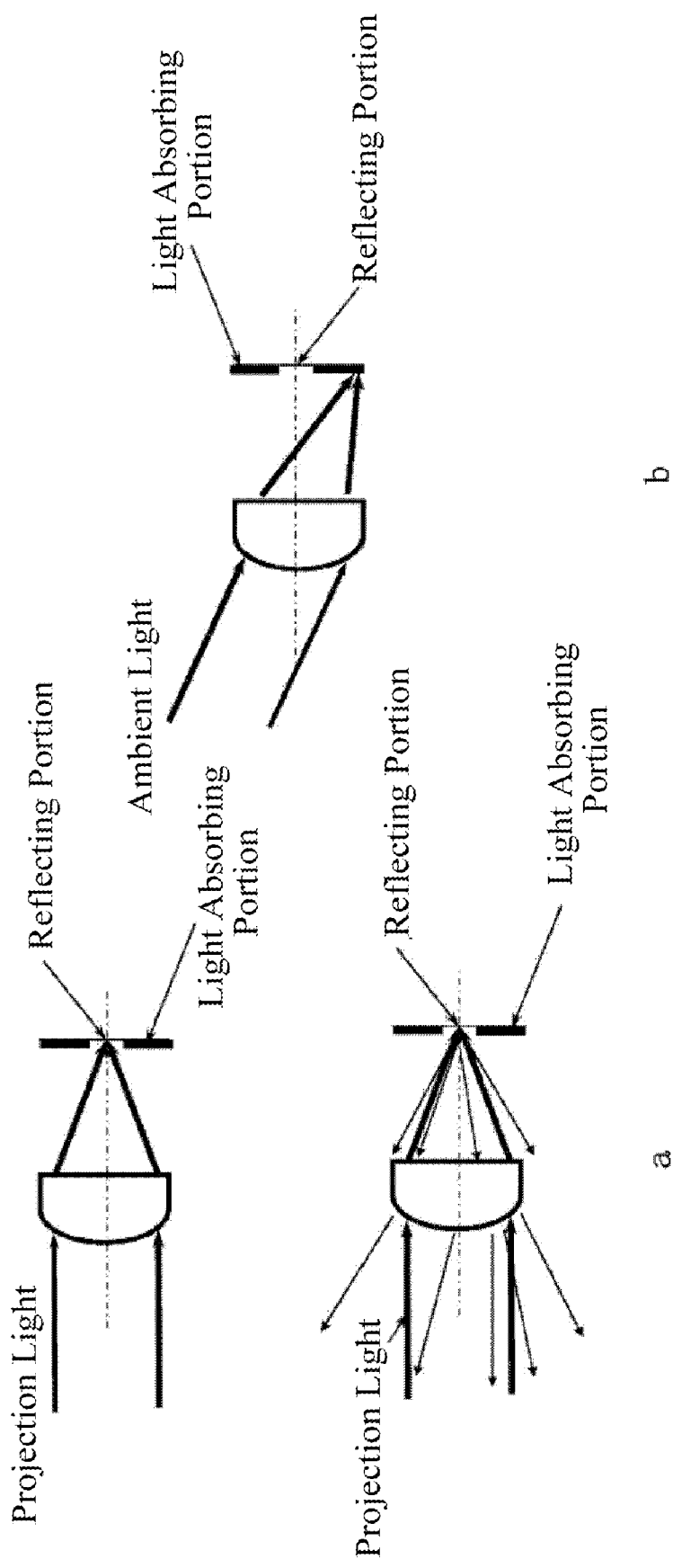
FIG. 3 is a structural schematic view of a projection system according to an embodiment of the present disclosure.

Under normal circumstances, the ambient light usually comes from a light bulb located on a ceiling or an upper portion of a wall of the room or is sunlight irradiating into the room from outside through a window, and most of light beams thereof irradiate diagonally downward onto the screen, while for ultra-short-throw projectors, the light beams thereof often irradiate diagonally upward on the screen from the bottom. Currently, the contrast of the projection screen is mainly improved by adopting a so-called black grid fine display screen and improved designs thereof. Typically, as shown in FIG. 1, such a screen consists of a black film layer grating capable of absorbing the ambient light, a micro-prism layer for controlling a direction of a light path, a micro surface structure diffusion film, and a glass bead reflective layer with a high-reflectivity. A basic principle for this type of screen to improve the contrast lies in that: in one aspect, the black film layer grating absorbs most of the ambient light; in another aspect, the glass bead layer normally reflects the projection light forming the projection image. An improved structure using this black grid fine display screen is shown in FIG. 2. This improved structure reflects the ambient light from above the screen to a perpendicularly arranged light absorbing layer, so that an area of the reflective layer for reflecting the projection light can be increased. In addition, another technique for improving the contrast of the projection screen is achieved by using a micro-lens array. FIG. 3 shows a schematic view of the principle of using a micro-lens array to improve the projection screen, FIG. 3a, which is on the left, shows a case where the projection light irradiates on such a screen, and FIG. 3b, which is on the right, shows a case where the ambient light irradiates on such a screen. As shown in FIG. 3a, the projection light incident from a specific direction is converged by the micro-lens provided on a surface of the projection screen to a reflecting portion located on an inner layer of the screen, and then it is reflected by the reflecting portion into a field of view of a viewer. As shown in FIG. 3b, the ambient light incident from other directions is converged by the micro-lens provided on the surface of the projection screen to the light absorbing portion located on the inner layer of the screen, and then is absorbed by the light absorbing portion. Since the light absorbing portion absorbs at least most of the incident ambient light, the display contrast of the screen can be improved.

However, the above two types of existing projection screens are all designed based on that the incident directions of the projection light and the ambient light are generally different. However, in practical application, the direction of the projection light is often not fixed, and it is possible that the direction of the projection light is approaching the incident direction of the ambient light. Therefore, the above projection screens can only eliminate the influence of the ambient light to a certain extent, and have a limited effect on improving the contrast.

The wavelength-selection filter layer includes a first optical layer, a light guiding layer and a second optical layer that are stacked sequentially, the light guiding layer is arranged on an incident side of the first optical layer, the second optical layer is arranged on an incident side of the light guiding layer, the first optical layer is provided with a reflecting portion and a light absorbing portion, and the second optical layer is provided with a high refractive index portion and a grating portion. The grating portion is configured to split the incident projection light into at least a plurality of specific light beams emitted at different angles from the grating portion towards the first optical layer, the plurality of reflecting portions are in one-to-one correspondence with the plurality of specific light beams and are configured to reflect the plurality of specific light beams into the high refractive index portion, and the plurality of specific light beams are totally reflected and combined in the high refractive index portion to form imaging light of the projection screen. The light absorbing portion is provided in the first optical layer at all positions except those where the plurality of light reflecting portions are provided, and the light absorbing portion is configured to absorb light beams emitted from the grating portion except the plurality of specific light beams.

The plurality of specific light beams include, for example, a red light beam, a green light beam, and a blue light beam.

Preferably, in the second optical layer, the high refractive index portion and the grating portion are arranged in a two-dimensional array in one-to-one correspondence with pixels of a projector.

The light absorbing layer can be a black light absorbing material layer, for example.

Preferably, an angle between the first surface and the second surface is in a range of 30° to 150°.

A saturable light absorbing material layer can be stacked on an incident side of the second optical layer, and a light transmittance of the saturable light absorbing material layer increases as an intensity of irradiated light increases. Alternatively, a polarizing film layer can be stacked on an incident side of the second optical layer. Alternatively, a saturable light absorbing material layer can be stacked on an incident side of the second optical layer, and a light transmittance of the saturable light absorbing material layer increases as an intensity of irradiated light increases, and a polarizing film layer is stacked on an incident side of the saturable light absorbing material layer. The polarizing film layer includes, for example, a ¼ wave plate layer and a polarizing plate layer that are stacked sequentially on the incident side.

The wavelength-selection filter layer includes a first optical layer, a light guiding layer, and a second optical layer that are stacked sequentially, the light guiding layer is arranged on an incident side of the first optical layer, the second optical layer is arranged on an incident side of the light guiding layer, the first optical layer is provided with a reflecting portion and a light absorbing portion, and the second optical layer is provided with a high refractive index portion and a grating portion. The grating portion is configured to split the incident projection light into at least a plurality of specific light beams emitted at different angles from the grating portion towards the first optical layer, the plurality of reflecting portions are provided in one-to-one correspondence with the plurality of specific light beams and are configured to reflect the plurality of specific light beams into the high refractive index portion, and the plurality of specific light beams are totally reflected and combined in the high refractive index portion to form imaging light of the projection screen. The light absorbing portion is provided in the first optical layer at all positions except those where the plurality of light reflecting portions are provided, and the light absorbing portion is configured to absorb light beams emitted from the grating portion except the plurality of specific light beams.

Preferably, in the second optical layer, the high refractive index portion and the grating portion are arranged in a two-dimensional array in one-to-one correspondence with pixels of a projector.

A saturable light absorbing material layer can be stacked on an incident side of the second optical layer, and a light transmittance of the saturable light absorbing material layer increases as an intensity of irradiated light increases. Alternatively, a polarizing film layer can be stacked on an incident side of the second optical layer. Alternatively, a saturable light absorbing material layer is further stacked on the incident side of the second optical layer, and a light transmittance of the saturable light absorbing material layer increases as an intensity of irradiated light increases, and a polarizing film layer is further stacked on the incident side of the saturable light absorbing material layer.

1. Overview of Principles of the Present Disclosure

The contrast of the projection screen is mainly affected by two aspects of performance. The first one is an anti-reflection effect to surrounding ambient light. A good screen has a strong anti-reflection effect to the surrounding ambient light, and contrast of the displayed image can be greatly improved. The second one refers to an influence of diffused light, which is formed by an internal structure of the screen itself, on the contrast of the image. Such influence is mainly an influence on the contrast in a dark background environment. The screen contrast can be expressed as:

$$C_C = \frac{T_D - T_A}{T_D + T_A}$$

In the formula, $T_D$ represents projection light, and $T_A$ represents ambient light reflected and scattered by the screen.

In actual screen design, the anti-reflection effect to the surrounding ambient light is the most critical performance index for improving the screen contrast. In the related art, as described above, the anti-reflection effect to the surrounding ambient light is usually achieved by adding a light absorbing material or reflecting ambient light of a specific direction by microstructures of the screen. Regardless of methods adopted, it is necessary to distinguish between projection light and ambient light, to only weaken brightness of the ambient light as much as possible while keeping brightness of the projection light basically unchanged according to differences between the projection light and the ambient light in certain optical characteristics (for example: direction, wavelength, intensity, polarization, coherence, etc.), thereby improving the contrast of the projection screen.

Here, it is necessary to propose a parameter describing these characteristics: general etendue.

Special etendue, or an original meaning of etendue, is an important parameter in non-imaging optics. It refers to a product of a cross-sectional area of a light beam and a projection of a spatial solid angle enclosed by the light beam on a normal line of the cross-section, and it is a parameter that describes convergence and divergence between light beams, as well as geometrical optical characteristics related to the cross-sectional area. A definition thereof is as follows:

etendue=$n^2 \iint \cos \theta dA d\Omega$

In the formula, n is a refractive index of a medium, θ is an angle between a normal line of an area dA and a central axis of a solid angle dΩ.

Figure 4:
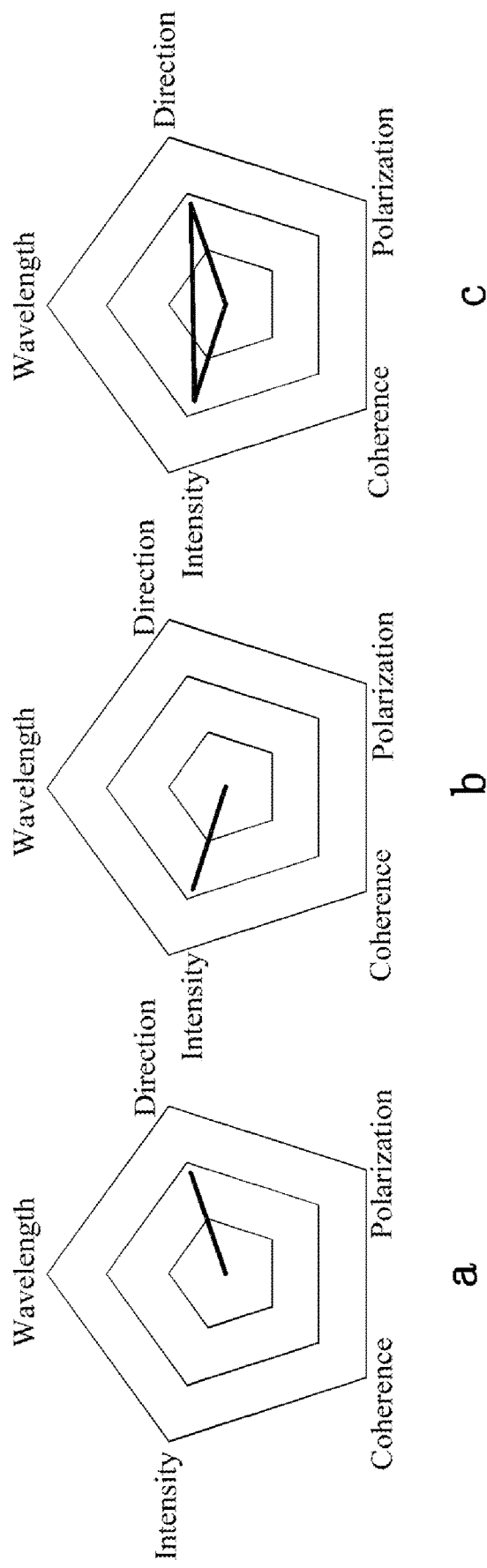
FIG. 4 is a schematic view showing an example of general etendue defined in the present disclosure.

In the present disclosure, the general etendue is defined on a basis of the special etendue, and it is used to describe the optical characteristics of a light beam of the projection screen, such as direction, wavelength, intensity, polarization and coherence etc. That is, the projection light can be regarded as a light signal, and a human eye viewing the projection is regarded as a receiver of the light signal. The projection light (light signal) will be affected by the ambient light (noise) in a signal transmission process of being reflected by the screen to the human eye (receiver), resulting in a decrease in contrast (reduction in signal-to-noise ratio). Therefore, it is desired that a projection screen device can modulate the projection light (light signal) and the ambient light (noise), so that the contrast is improved (the signal-to-noise ratio is increased). Capacity of the projection screen to modulate the projection light (light signal) and the ambient light (noise) can be described by the parameter—the general etendue. For example, if a screen reflects ambient light from a specific direction only by the surface microstructures, then the projection light (light signal) and the ambient light (noise) are modulated from one dimension—the light beam direction, and the general etendue thereof is as shown in FIG. 4a. If a screen uses only the light absorbing material to absorb ambient light, then the projection light (light signal) and the ambient light (noise) are modulated through one dimension—the intensity, and the generalized etendue thereof is as shown in FIG. 4b. In addition, as in the aforementioned related art, the screen provided with both the light absorbing material and the surface microstructures modulates the projection light (light signal) and the ambient light (noise) from two dimensions—light beam direction and intensity, and the general etendue thereof is as shown in FIG. 4c.

The present disclosure takes the projection screen as a signal adjustment device to newly define it and proposes a general etendue as a new method for describing a function of the projection screen, aiming to break a single function and design method of previous projection screen devices and improve the contrast of the screen based on the above principles combined with various means.

First Embodiment

Figure 5:
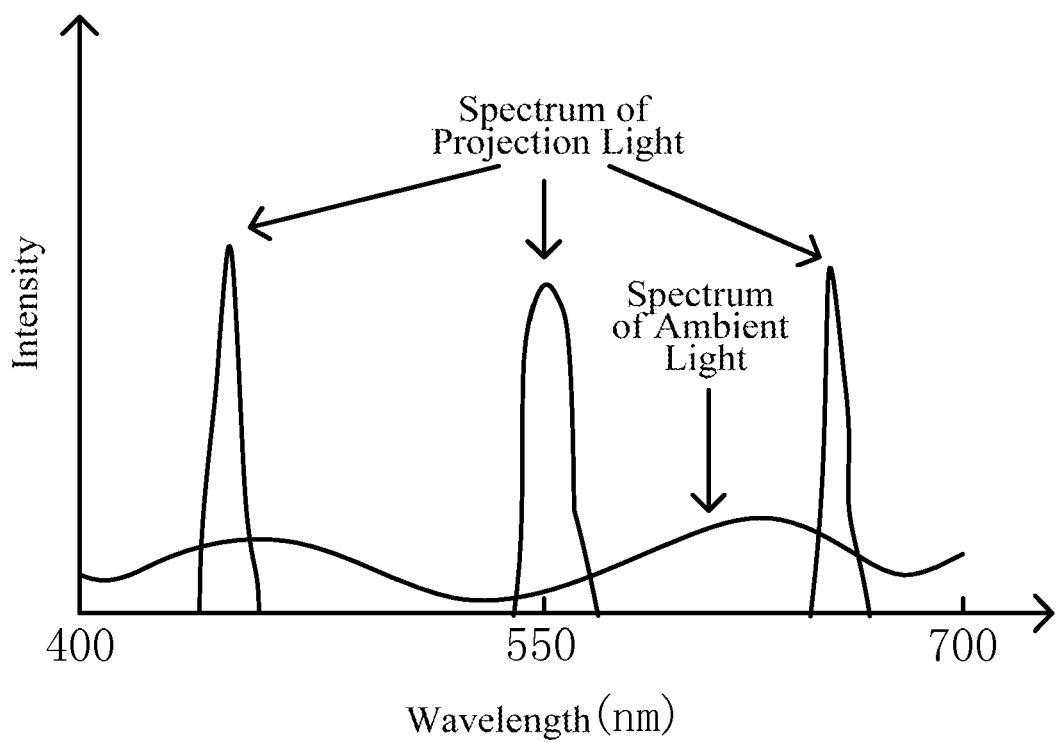
FIG. 5 is a schematic view showing wavelength ranges of narrow-spectrum projection light and wide-spectrum ambient light.

As shown in FIG. 5, for a projection device such as a laser projector, projection light thereof is narrow-spectrum light. However, for ambient light such as sunlight and lamp light, they are all broad-spectrum lights. Therefore, according to the above-mentioned general etendue, a difference in wavelength characteristics of the projection light and the ambient light can be used for selective modulation, thereby improving the contrast of the projection device.

Figure 6:
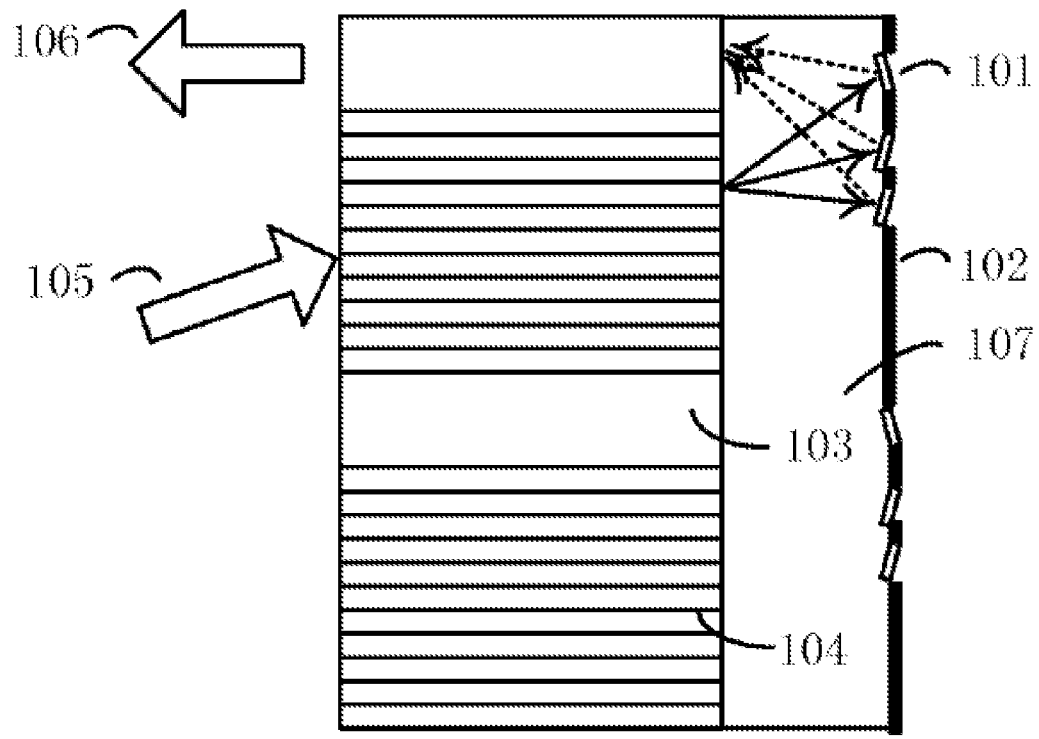
FIG. 6 shows a principle schematic view of a grating microstructure of a projection screen according to a first embodiment of the present disclosure.

FIG. 6 shows a principle schematic view of a projection screen according to the first embodiment of the present disclosure. On a surface of the projection screen, a grating microstructure as shown in FIG. 6 is provided and used as a wavelength-selection filter layer. As shown in FIG. 6, the grating microstructure has a structure having three layers, in which, a layer located on an inner side of the screen (that is, away from an incident side, hereinafter also referred to as a first optical layer) includes a reflecting portion 101 and a light absorbing portion 102, a layer located on an outer side of the screen (i.e., the incident side of the screen, hereinafter also referred to as a second optical layer) includes a high refractive index portion 103 and a grating portion 104, and between the first optical layer on the inner side of the screen and the second optical layer on the outer side of the screen, a light guiding layer 107 made of a transparent material such as glass is further provided.

In the second optical layer located on the outer side of the screen, the grating portion 104 is provided at a position irradiated by an incident light beam 105. The grating portion 104 is formed of a resin material such as PET, PP, or the like, for example. The grating portion 104 can split the incident light beam into a plurality of light beams including a red (R) light beam, a green (G) light beam, and a blue (B) light beam (that is, a plurality of specific light beams) according to wavelengths. The plurality of light beams are emitted at different angles from the grating portion 104. In the first optical layer located on the inner side of the screen, a plurality of reflecting portions 101 are respectively provided at positions irradiated by the R light beam, the G light beam, and the B light beam which are emitted from the grating portion 104 and passed through the light guiding layer 107. Optional materials of the reflecting portion 101 include white reflective resin, photoresist containing reflective particles, and the like. The plurality of reflecting portions 101 can respectively reflect the R light beam, the G light beam and the B light beam irradiated thereon to the high refractive index portion 103 of the second optical layer located on the outer side of the screen and facilitate these light beams enter the high refractive index portion 103 at a specific incidence angle (the specific incidence angle is related to refractive indexes of the high refractive index portion and the grating portion and should generally be smaller than 40°). The high refractive index portion 103 may be, for example, a square rod made of a transparent material having a high refractive index. The R light beam, the G light beam, and the B light beam are totally reflected and combined in the high refractive index portion 103. After being totally reflected and combined, the R light beam, the G light beam, and the B light beam constitute imaging light 106 of the projection screen. The light absorbing portion 102 is provided in the first optical layer at all positions except those where the plurality of light reflecting portions 101 are provided. The light absorbing portion 102 may be, for example, a black light absorbing layer, and it can absorb most of light irradiated on a surface thereof. Therefore, except the R light beam, the G light beam and the B light beam mentioned above, a plurality of light beams emitted from the grating portion 104 are irradiated on the light absorbing portion 102 in the first optical layer located on the inner side of the screen and are absorbed by the light absorbing portion 102. In this way, the projection light composed of the three primary colors of R, G and B is reflected, substantially without loss, by the projection screen having the above microstructure, while most of the ambient light (especially stray light of colors except the R, G, and B) is absorbed by the projection screen. Therefore, the contrast of the projection image can be greatly improved.

Figure 7:
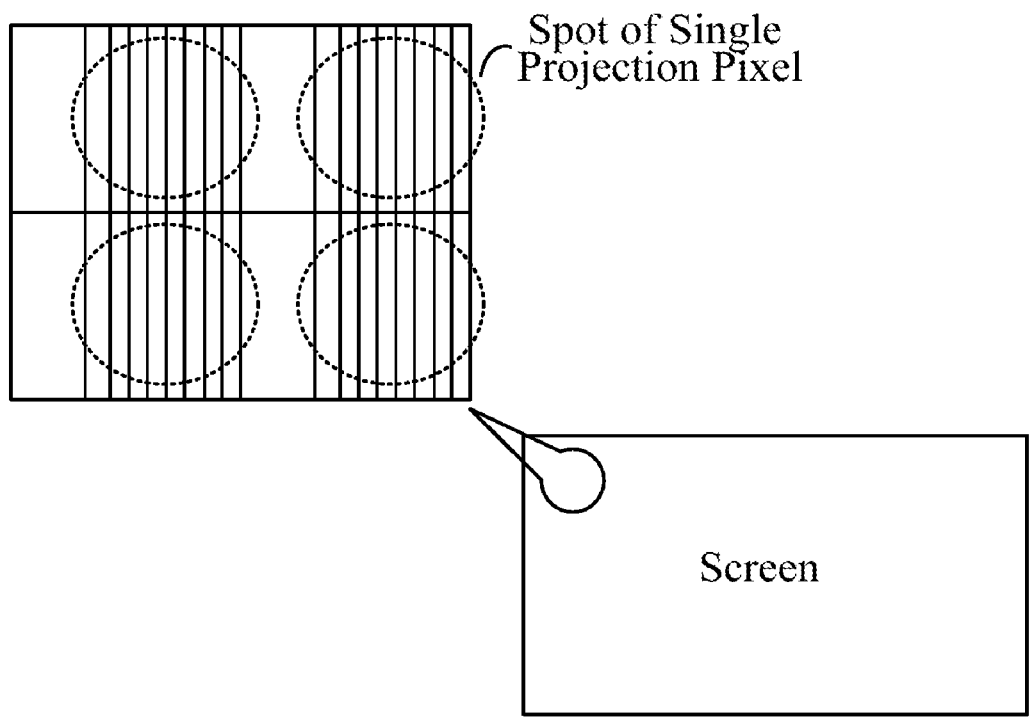
FIG. 7 illustrates a partially enlarged schematic plan view of a projection screen according to the first embodiment of the present disclosure.

As shown in FIG. 7, the above-mentioned grating microstructure having a three-layer structure is arranged on the surface of the projection screen in a same array structure as pixels of the projector, such that projection light beams 105 from one pixel of the projector are respectively impinge the corresponding grating portion 104 and form the imaging light 106 after a reflection of the corresponding reflecting portion 101 and a total reflection and light combining of the corresponding high refractive index portion 103. In an enlarged part in FIG. 7, a dotted circle represents a spot formed by the projection light beams of one pixel on the grating portion of the grating microstructure. In other words, the above grating microstructures are arranged in an array on the surface of the projection screen, and the grating microstructures are arranged in one-to-one correspondence with the projection pixels of the projector. Specifically, in the above-mentioned second optical layer, the high refractive index portion 103 and the grating portion 104 are arranged in a two-dimensional array in one-to-one correspondence with pixels of the projector; in the above-mentioned first optical layer, the reflecting portions 101 are arranged in a two-dimensional array in a corresponding form. Such an arrangement enables the projection light beam from each pixel to be reflected by the projection screen having corresponding the microstructure into field of view of the audience without loss, so as to ensure an optical efficiency of the projection screen while enhancing the contrast of the projection image.

It should be noted that the grating microstructure in the projection screen proposed in this embodiment modulates the projection light and the ambient light from the wavelength dimension. For ease of explanation, the above provides a preferred example with a projector using a pure laser light source. However, the present disclosure is not limited to the pure laser light source, as long as the spectrum of the projection light is different from that of the ambient light, and the projection screens of this embodiment can all achieve the effect of improving the contrast of the projection image.

Second Embodiment

Figure 8:
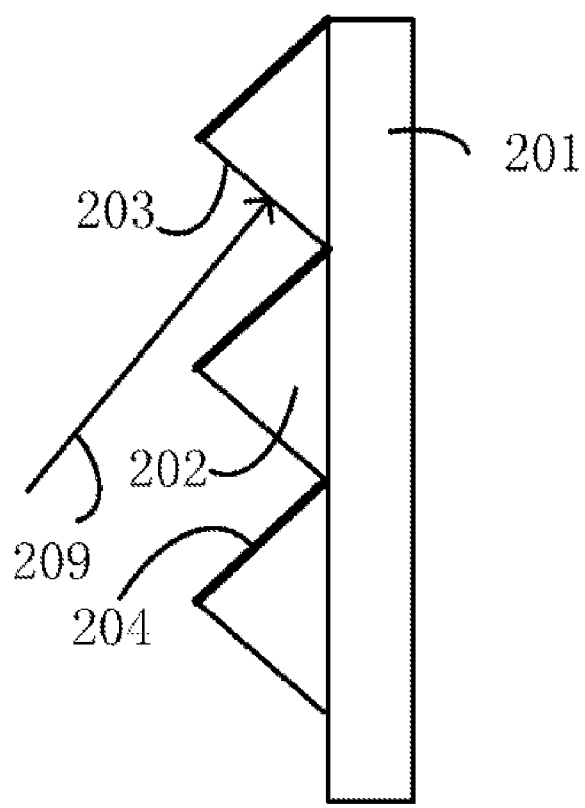
FIG. 8 illustrates a cross-sectional schematic view of a projection screen according to a second embodiment of the present disclosure.

FIG. 8 illustrates a cross-sectional schematic view of a projection screen according to a second embodiment of the present disclosure. Compared with the first embodiment, the surface on the incident side of the projection screen of this embodiment adopts a structure sawtooth shape of the black grid fine display screen described above, and part of a surface of the structure of sawtooth shape facing the projection light side is provided with the above-mentioned grating microstructure.

Specifically, the projection screen includes a screen substrate 201 and a light reflecting portion 202. The light reflecting portion 202 includes a first surface 203 and a second surface 204 which face different directions, and the first surface 203 faces the incident direction of the projection light 209. Optionally, as shown in FIG. 8, the light reflecting portion 202 has a triple-prism structure, the first surface 203 faces the projection light 209 incident direction from obliquely below, and an angle between the first surface 203 and the second surface 204 is preferably in a range of 30° to 150°. When the angle between the first surface 203 and the second surface 204 is too small, a relative angle between the first surface 203 and the projection light 209 and a relative angle between the first surface 203 and the screen plane are too large, which may cause that part of the projection light 209 cannot successfully enter the screen substrate 201 on a rear side of the light reflecting portion 202 and it is difficult for the emitted projection light to enter the field of view of the audience; when the angle between the first surface 203 and the second surface 204 is too large, the first surface 203 and the second surface 204 cannot effectively separate the projection light and the ambient light. The light reflecting portions 202 having the first surface 203 and the second surface 204 are continuously arranged on the incident side of the screen substrate 201 to form a structure of sawtooth shape. The first surface 203 is provided with the above grating microstructure, and the second surface 204 is provided with a black light absorbing layer. Therefore, the projection light 209 is reflected, substantially without loss, by the first surface 203 provided with the above-mentioned microstructures into the field of view of the audience. Moreover, the ambient light is absorbed by the light absorbing layer of the second surface 204 and the light absorbing portion of the grating microstructure.

The projection screen according to the second embodiment of the present disclosure distinguishes and modulates the projection light and the ambient light from two dimensions—wavelength and angle, and it has a larger general etendue compared with the projection screen of the first embodiment and thus has a better effect of improving the contrast of the projection image.

Third Embodiment

According to the definition of the general etendue, in addition to the above two dimensions of wavelength and angle, the projection screen can also use further technical means to distinguish and modulate the projection light and the ambient light to further enhance the contrast of the projection image.

For example, many existing projection devices adopt LCD and LCOS to perform light processing. This type of processing requires that the incident light is polarized light and the emitted light is also polarized light. Generally, linearly polarized light of the projector is converted into elliptically polarized light by providing a ¼ wave plate in front of a lens of the projector. The ambient light is usually natural light. Accordingly, the projection light and the ambient light can be distinguished in the polarization dimension. For another example, the luminous flux of the existing projection device is usually in a range of hundreds to thousands of lumens. Compared with the ambient light in most movie viewing occasions, the brightness of the projection light (or the intensity of the projection light) is very high. Therefore, it is possible to distinguish between the projection light and the ambient light in the dimension of light intensity.

Figure 9:
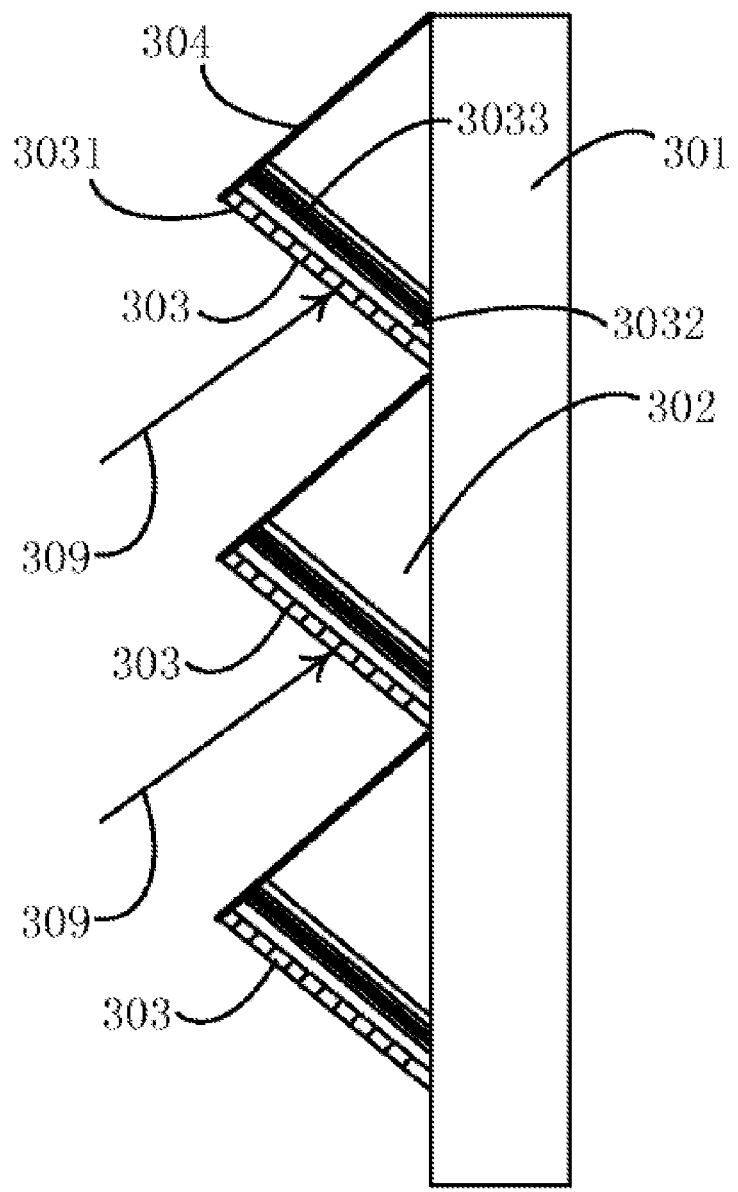
FIG. 9 illustrates a cross-sectional schematic view of a projection screen according to a third embodiment of the present disclosure.
Figure 10:
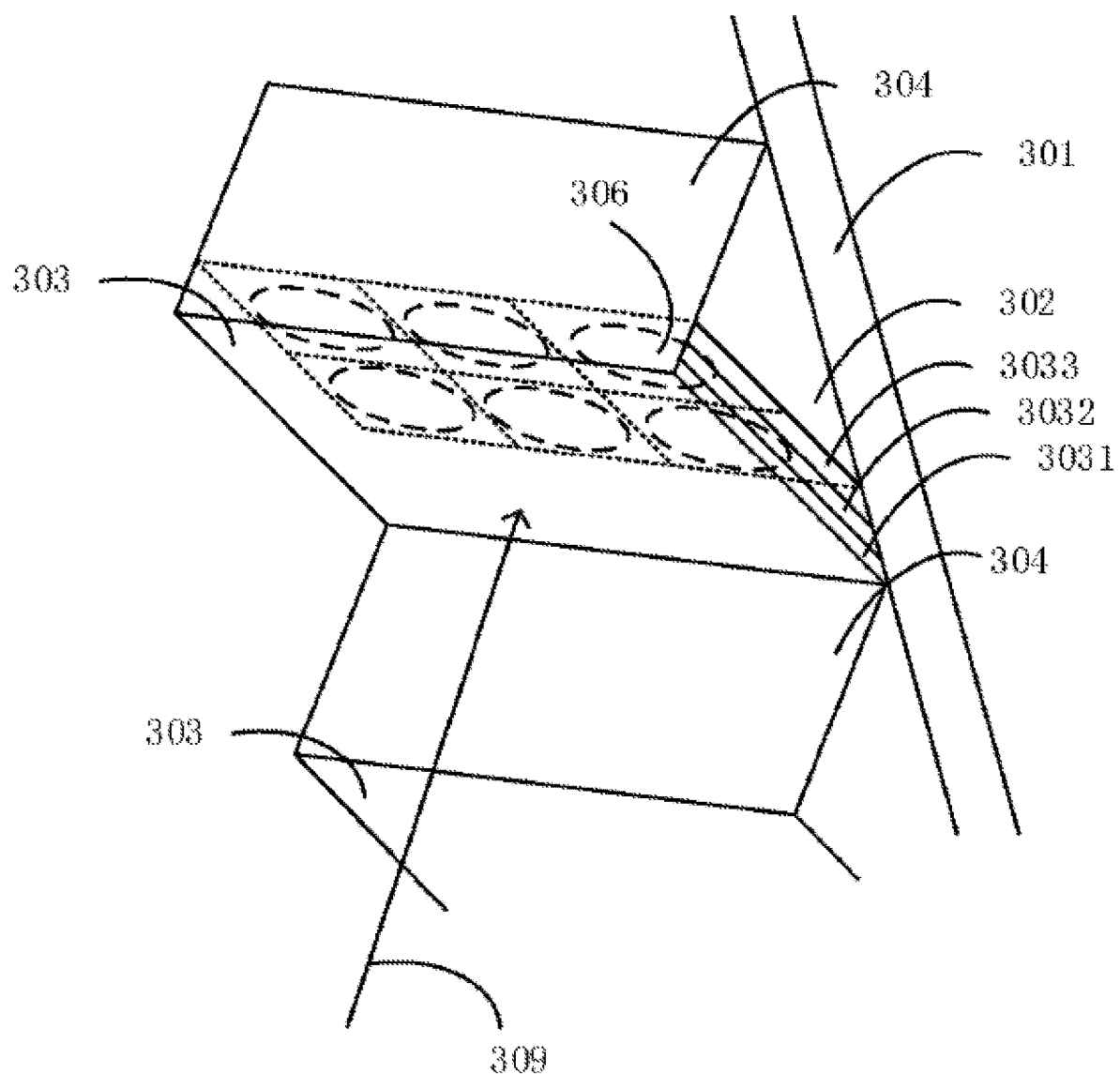
FIG. 10 illustrates a schematic perspective view of a projection screen according to the third embodiment of the present disclosure.

FIG. 9 illustrates a cross-sectional schematic view of a projection screen according to a third embodiment of the present disclosure. FIG. 10 illustrates a schematic perspective view of a projection screen according to the third embodiment of the present disclosure. Similar to the projection screen of the second embodiment in FIG. 8, the projection screen of the present embodiment includes a screen substrate 301 and a light reflecting portion 302. The light reflecting portion 302 includes a first surface 303 and a second surface 304 which face different directions, and the first surface 303 faces an incident direction of the projection light 309. Optionally, as shown in FIG. 9, the light reflecting portion 302 has a triple-prism structure, the first surface 303 faces the projection light 309 incident direction obliquely from below, and an angle between the first surface 303 and the second surface 304 is preferably in a range of 30° to 150°. When the angle between the first surface 303 and the second surface 304 is too small, both a relative angle between the first surface 303 and the projection light 309 and a relative angle between the first surface 303 and the screen plane are too large, which may cause that part of the projection light 309 cannot successfully enter the screen substrate 301 on a rear side of the light reflecting portion 302 and it is difficult for the emitted projection light to enter the field of view of the audience; when the angle between the first surface 303 and the second surface 304 is too large, the first surface 303 and the second surface 304 cannot effectively separate the projection light and the ambient light. A polarizing film layer 3031, a saturable light absorbing material layer 3032, and a grating microstructure layer 3033 are sequentially stacked on the first surface 303. A black light absorbing layer is provided on the second surface 304.

Figure 11:
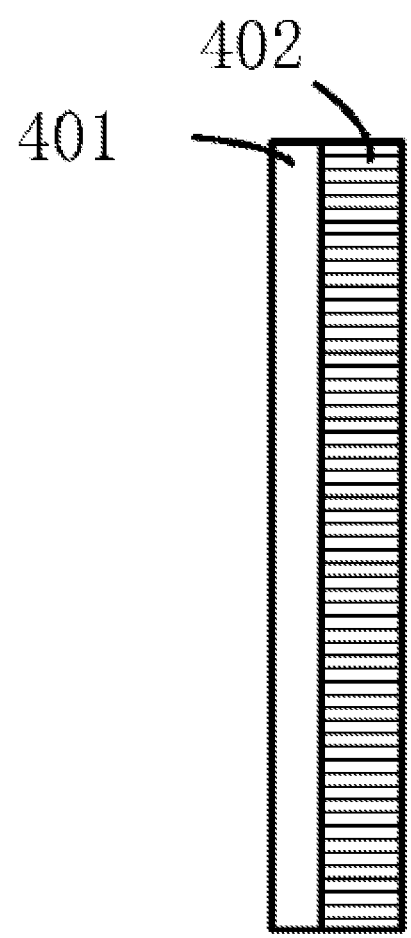
FIG. 11 illustrates a structural schematic view of a polarizing film layer of a projection screen according to the third embodiment of the present disclosure.

The polarizing film layer 3031 has, for example, a structure shown in FIG. 11. 401 is a ¼ wave plate layer; 402 is a polarizing plate layer, whose optional materials include organic polarizing plates, inorganic polarizing plates and so on. It is set that the ¼ wave plate layer 401 is disposed on an outermost layer of the screen, and its rotation direction is opposite to that of the ¼ wave plate provided in front of the lens of the projector. Therefore, the ¼ wave plate layer can convert elliptically polarized light emitted from the projector into linearly polarized light. For the ambient light, it is still natural light after passing through the ¼ wave plate layer. After that, the two pass through the polarizing plate layer 402 together. It should be understood that if the projector is not provided with the ¼ wave plate, then the polarizing film layer 3031 does not need to be provided with the ¼ wave plate layer. In this case, the linearly polarized light emitted from the projector is directly impinge the polarizing plate layer 402. A light transmission direction of the polarizing plate layer 402 is provided such that the linearly polarized light of the projection light can pass without loss, while only at most half of the ambient light, which is natural light, can pass. Therefore, in theory, by providing the polarizing film layer 3031, the contrast of the projection screen can be doubled.

The saturable light absorbing material layer 3032 is made of a saturable light absorbing material such as graphene, semiconductor saturable absorber, carbon nanotube, and the like, for example. This type of material has a relatively high absorption rate for light having a relatively low intensity (that is, the light transmittance is relatively low) and has an absorption rate of basically 0 for light having a relatively high intensity (that is, the light transmittance is high). In other words, the light transmittance of such materials increases as the intensity of the irradiated light increases. Generally, in a high-grayscale image or a high-grayscale part of an image, the intensity of the projection light is much larger than that of the ambient light, so the ambient light has little effect on the image contrast in this case. In a low-grayscale image or a low-grayscale part of an image, the intensity of the projection light is relatively weak, and the intensity of the ambient light may even exceed that of the projection light, which results in that an ought-to-be-dark part of the image cannot be dark so that the contrast is reduced. In other words, the influence of the ambient light on the contrast of the projection image mainly acts on the low-grayscale image or the low-grayscale part of the image. According to the above characteristics of the saturable light absorbing material layer 3032, if such a saturable light absorbing material layer 3032 is stacked on the projection screen, and when the projection light is relatively weak (the low-grayscale image or the low-grayscale part of the image), it can absorb most of the projection light and illumination light, while when the projection light is strong (the high-grayscale image or the high-grayscale part of the image), the projection light and the ambient light are transmitted substantially without loss. As a result, the problem of reduction in the contrast in the low-grayscale image or the low-grayscale part of the image caused by the image being unable to be dark is solved. Therefore, the contrast of the projection screen is further effectively improved.

The grating microstructure layer 3033 may be, for example, the grating microstructure layer arranged in a two-dimensional array as described in the first embodiment and the second embodiment. As shown in FIG. 10, the projection light 309 from each pixel of the projector is respectively incident on the corresponding grating portion and forms a spot 306, as described above.

As shown in FIGS. 9 and 10, the polarizing film layer 3031, the saturable light absorbing material layer 3032, and the grating microstructure layer 3033 are sequentially stacked on the first surface 303 of the light reflecting portion 302 of the projection screen, which distinguish and modulate the ambient light and the projection light from three dimensions—polarization direction, intensity and wavelength, so as to filter out at least most of the ambient light while reflecting the projection light without loss, thereby greatly improving the contrast of the projection screen. For example, different layers can be bonded together with adhesives such as glue. It should be understood that the stacking order of the polarizing film layer 3031 and the saturable light absorbing material layer 3032 can be adjusted. In addition, it is possible that only the polarizing film layer 3031 and the grating microstructure layer 3033 are provided, or only the saturable light absorbing material layer 3032 and the grating microstructure layer 3033 are provided.

The capacity of this type of screen to improve the contrast can be described using the concept of the general etendue proposed above, and a definition formula is given here:

$$\text{etendue}' = n^2 P \cdot \frac{I_e}{I_{min}} \int\int\int \cos\theta dA d\Omega d\lambda$$

In the formula, n is a refractive index of the medium, θ is an angle between a normal line of an area dA and a central axis of a solid angle dΩ, P is a capacity of the screen to modulate polarization of the light beam, P=2 when there is a polarizing film layer, otherwise P=1. $I_e$ refers to an intensity of the imaging light of the projection screen at the position of an audience when the brightness of the projection light is 0 grayscale, $I_{min}$ refers to an intensity of the imaging light of the projection screen at the position of the audience when the brightness of the projection light is 0 grayscale after the saturable light absorbing material layer is provided in the projection screen. If no saturable light absorbing material layer is provided in the projection screen, then $I_e = I_{min}$.

In addition, the stacking structure of the polarizing film layer 3031, the saturable light absorbing material layer 3032, and the grating microstructure layer 3033 in the present embodiment can also be applied to the first embodiment. In this case, the surface of the projection screen does not have the reflecting portions arranged continuously in the structure of sawtooth shape, and the polarizing film layer 3031, the saturable light absorbing material layer 3032 and the grating microstructure layer 3033 are directly stacked on the entire surface of the projection screen.

It should be understood that the above-mentioned embodiments are only examples of improving the image contrast of the projection screen according to the principle of the general etendue defined herein. The present disclosure is not limited to this. For example, in addition to using the grating microstructure described above, it is also possible to distinguish and modulate the projection light and the ambient light from the wavelength dimension by the way of coating the surface of the screen with films to change transmittance/reflectivity of the light of different wavelengths or by way of preparing a dye layer on the screen to absorb light of specific wavelengths, etc. For another example, in addition to the above-mentioned wavelength, polarization direction and intensity, it is also possible to distinguish and modulate the projection light and the ambient light in a coherence dimension, for example, by providing an antireflection film.

Those skilled in the art should understand that various changes, combinations, sub-combinations and modifications can be made to the above-mentioned embodiments without departing from the essence or scope defined by the appended claims of the present disclosure.

What is claimed is:

1. A projection screen, comprising a screen substrate and a plurality of light reflecting portions, wherein the light reflecting portion is arranged on an incident side of the screen substrate, and has a first surface and a second surface that face different directions, the first surface facing an incident direction of projection light, and the plurality of light reflecting portions are continuously arranged on the screen substrate to form a structure of sawtooth shape, wherein
   a light absorbing layer is provided on the second surface; and
   a wavelength-selection filter layer is provided on the first surface, and the wavelength-selection filter layer is configured to reflect the projection light and transmit and absorb at least part of ambient light,
   wherein the wavelength-selection filter layer comprises a first optical layer, a light guiding layer, and a second optical layer that are stacked sequentially, wherein the light guiding layer is arranged on an incident side of the first optical layer, the second optical layer is arranged on an incident side of the light guiding layer, the first optical layer is provided with a reflecting portion and a light absorbing portion, and the second optical layer is provided with a high refractive index portion and a grating portion, and
   wherein the grating portion is configured to split the incident projection light into at least a plurality of specific light beams emitted at different angles from the grating portion towards the first optical layer, wherein the plurality of reflecting portions are provided in one-to-one correspondence with the plurality of specific light beams and are configured to reflect the plurality of specific light beams into the high refractive index portion, and the plurality of specific light beams are totally reflected and combined in the high refractive index portion to form imaging light of the projection screen.

2. The projection screen according to claim 1, wherein the light absorbing portion is provided in the first optical layer at all positions except those where the plurality of light reflecting portions are provided, and the light absorbing portion is configured to absorb light beams emitted from the grating portion except the plurality of specific light beams.

3. The projection screen according to claim 2, wherein the plurality of specific light beams comprise a red light beam, a green light beam, and a blue light beam.

4. The projection screen according to claim 2, wherein in the second optical layer, the high refractive index portion and the grating portion are arranged in a two-dimensional array in one-to-one correspondence with pixels of a projector.

5. The projection screen according to claim 2, wherein a saturable light absorbing material layer is stacked on an incident side of the second optical layer, and a light transmittance of the saturable light absorbing material layer increases as an intensity of irradiated light increases.

6. The projection screen according to claim 2, wherein a polarizing film layer is stacked on an incident side of the second optical layer.

7. The projection screen according to claim 6, wherein the polarizing film layer comprises a ¼ wave plate layer and a polarizing plate layer that are stacked sequentially on the incident side.

8. The projection screen according to claim 2, wherein a saturable light absorbing material layer is stacked on an incident side of the second optical layer, and a light transmittance of the saturable light absorbing material layer increases as an intensity of irradiated light increases, and
   a polarizing film layer is stacked on an incident side of the saturable light absorbing material layer.

9. The projection screen according to claim 8, wherein the polarizing film layer comprises a ¼ wave plate layer and a polarizing plate layer that are stacked sequentially on the incident side.

10. The projection screen according to claim 1, wherein the light absorbing layer is a black light absorbing material layer.

11. The projection screen according to claim 1, wherein an angle between the first surface and the second surface is in a range of 30° to 150°.

12. A projection screen, wherein,
- a wavelength-selection filter layer is provided on an incident surface of the projection screen, and configured to reflect projection light and absorb at least part of ambient light based on a difference in wavelength characteristics of the projection light and the ambient light,
- wherein the wavelength-selection filter layer comprises a first optical layer, a light guiding layer, and a second optical layer that are stacked sequentially, wherein the light guiding layer is arranged on an incident side of the first optical layer, the second optical layer is arranged on an incident side of the light guiding layer, the first optical layer is provided with a reflecting portion and a light absorbing portion, and the second optical layer is provided with a high refractive index portion and a grating portion, and
- wherein the grating portion is configured to split the incident projection light into at least a plurality of specific light beams emitted at different angles from the grating portion towards the first optical layer, wherein the plurality of reflecting portions are provided in one-to-one correspondence with the plurality of specific light beams and are configured to reflect the plurality of specific light beams into the high refractive index portion, and the plurality of specific light beams are totally reflected and combined in the high refractive index portion to form imaging light of the projection screen.

13. The projection screen according to claim 12, wherein the light absorbing portion is provided in the first optical layer at all positions except those where the plurality of light reflecting portions are provided, and the light absorbing portion is configured to absorb light beams emitted from the grating portion except the plurality of specific light beams.

14. The projection screen according to claim 13, wherein in the second optical layer, the high refractive index portion and the grating portion are arranged in a two-dimensional array in one-to-one correspondence with pixels of a projector.

15. The projection screen according to claim 13, wherein a saturable light absorbing material layer is further stacked on an incident side of the second optical layer, and a light transmittance of the saturable light absorbing material layer increases as an intensity of irradiated light increases.

16. The projection screen according to claim 13, wherein a polarizing film layer is further stacked on the incident side of the second optical layer.

17. The projection screen according to claim 13, wherein a saturable light absorbing material layer is further stacked on the incident side of the second optical layer, and a light transmittance of the saturable light absorbing material layer increases as an intensity of irradiated light increases, and
- a polarizing film layer is further stacked on the incident side of the saturable light absorbing material layer.

18. The projection screen according to claim 13, wherein plurality of reflecting portions are configured to reflect the plurality of specific light beams to enter the high refractive index portion at a specific incident angle, so that the plurality of specific light beams are totally reflected in the high refractive index portion.

19. The projection screen according to claim 18, wherein the specific incident angle is smaller than 40°.

20. A projection screen, wherein,
- a wavelength-selection filter layer is provided on an incident surface of the projection screen, and configured to reflect projection light and absorb at least part of ambient light based on a difference in wavelength characteristics of the projection light and the ambient light,
- wherein the wavelength-selection filter layer comprises a first optical layer, a light guiding layer, and a second optical layer that are stacked sequentially, wherein the light guiding layer is arranged on an incident side of the first optical layer, the second optical layer is arranged on an incident side of the light guiding layer, the first optical layer is provided with a reflecting portion and a light absorbing portion, and the second optical layer is provided with a high refractive index portion and a grating portion, and
- wherein in the second optical layer, the high refractive index portion and the grating portion are arranged in a two-dimensional array in one-to-one correspondence with pixels of a projector.

* * * * *